United States Patent
Sobanski et al.

(10) Patent No.: US 12,428,986 B2
(45) Date of Patent: Sep. 30, 2025

(54) AIRCRAFT PROPULSION SYSTEM ENGINE WITH MULTIPLE INDEPENDENT ROTATING STRUCTURES

(71) Applicant: Raytheon Technologies Corporation, Farmington, CT (US)

(72) Inventors: Jon E. Sobanski, Glastonbury, CT (US); Brandon M. Evans, San Antonio, TX (US); Simon W. Evans, Farmington, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/217,830

(22) Filed: Jul. 3, 2023

(65) Prior Publication Data
US 2025/0012213 A1    Jan. 9, 2025

(51) Int. Cl.
*F02K 3/06*    (2006.01)
*B64D 27/02*   (2006.01)
*F02C 3/06*    (2006.01)
*F02C 7/36*    (2006.01)

(52) U.S. Cl.
CPC .............. *F02C 3/06* (2013.01); *B64D 27/026* (2024.01); *F02C 7/36* (2013.01); *F02K 3/06* (2013.01)

(58) Field of Classification Search
None
See application file for complete search history.

(56) References Cited

U.S. PATENT DOCUMENTS

| | | |
|---|---|---|
| 2,073,191 A | 3/1937 | Belluzzo |
| 9,828,911 B2 | 11/2017 | Burghardt |
| 10,024,235 B2 | 7/2018 | Suciu |
| 10,415,466 B2 | 9/2019 | Suciu |
| 11,136,899 B2 | 10/2021 | Kupratis |
| 11,519,289 B2 | 12/2022 | Suciu |
| 2015/0292408 A1* | 10/2015 | Suciu ............... B01D 46/62 55/482 |
| 2019/0061964 A1* | 2/2019 | Murrow ............. B64C 29/00 |
| 2019/0353104 A1* | 11/2019 | Kupratis ............... F02K 5/00 |

(Continued)

FOREIGN PATENT DOCUMENTS

DE    4113247 A1    10/1992

OTHER PUBLICATIONS

EP Search Report for EP Patent Application No. 24173929.1 dated Oct. 11, 2024.

*Primary Examiner* — Gerald L Sung
(74) *Attorney, Agent, or Firm* — Getz Balich LLC

(57) ABSTRACT

A turbine engine is provided that includes a propulsor rotor and an engine core. The propulsor rotor is rotatable about a propulsor axis. The engine core is configured to power operation of the propulsor rotor. The engine core includes a core compressor section, a core combustor section, a core turbine section, a first rotating structure and a second rotating structure. The first rotating structure includes a first compressor rotor arranged within the core compressor section. The first rotating structure is rotatable about a first structure axis which is offset from the propulsor rotor axis. The second rotating structure includes a second compressor rotor arranged within the core compressor section. The second rotating structure is rotatable about a second structure axis which is offset from the propulsor rotor axis and the first structure axis.

15 Claims, 6 Drawing Sheets

(56) References Cited

U.S. PATENT DOCUMENTS

| | | | |
|---|---|---|---|
| 2020/0095933 A1* | 3/2020 | Tang | F02C 9/54 |
| 2020/0141416 A1 | 5/2020 | Plante | |
| 2020/0392904 A1* | 12/2020 | Kupratis | F02C 3/113 |
| 2021/0071585 A1* | 3/2021 | Kupratis | F02C 6/14 |
| 2021/0172333 A1 | 6/2021 | Suciu | |
| 2021/0355869 A1* | 11/2021 | Lefebvre | F02C 7/36 |
| 2022/0074349 A1* | 3/2022 | Valois | F02C 3/10 |
| 2022/0412290 A1* | 12/2022 | Smith | F02C 7/36 |

\* cited by examiner

AIRCRAFT PROPULSION SYSTEM ENGINE WITH MULTIPLE INDEPENDENT ROTATING STRUCTURES

GOVERNMENT LICENSE RIGHTS

This invention was made with Government support under Contract DE-AR0001561 awarded by the United States Department of Energy, Office of ARPA-E. The Government has certain rights in this invention.

BACKGROUND OF THE DISCLOSURE

1. Technical Field

This disclosure relates generally to an aircraft and, more particularly, to a propulsion system for the aircraft.

2. Background Information

Various types and configurations of propulsion systems are known in the art for an aircraft. While these known propulsion systems have various benefits, there is still room in the art for improvement.

SUMMARY OF THE DISCLOSURE

According to an aspect of the present disclosure, a turbine engine is provided that includes a propulsor rotor, an engine core and a flowpath. The propulsor rotor is rotatable about a propulsor axis. The engine core is configured to power operation of the propulsor rotor. The engine core includes a core compressor section, a core combustor section, a core turbine section, a first rotating structure and a second rotating structure. The first rotating structure includes a first compressor rotor arranged within the core compressor section. The first rotating structure is rotatable about a first structure axis which is offset from the propulsor rotor axis. The second rotating structure includes a second compressor rotor arranged within the core compressor section. The second rotating structure is rotatable about a second structure axis which is offset from the propulsor rotor axis and the first structure axis. The flowpath extends through the core compressor section, the core combustor section and the core turbine section from an inlet into the flowpath to an exhaust from the flowpath.

According to another aspect of the present disclosure, another turbine engine is provided that includes a first rotating assembly, a first core rotating structure, a second core rotating structure, a combustor and a flowpath. The first rotating assembly includes a propulsor rotor and a power turbine rotor configured to drive rotation of the propulsor rotor. The first core rotating structure includes a first compressor rotor. The second core rotating structure includes a second compressor rotor and a turbine rotor. The flowpath extends sequentially across the first compressor rotor, the second compressor rotor, the combustor and the turbine rotor. The first rotating assembly does not extend axially through the first core rotating structure or the second core rotating structure. The first core rotating structure does not extend axially through the second core rotating structure.

According to still another aspect of the present disclosure, another turbine engine is provided that includes a propulsor rotor, a power turbine rotor, a first compressor rotor, an electric machine, a second compressor rotor, a turbine rotor, a combustor and a flowpath. The power turbine rotor is coupled to and is configured to drive rotation of the propulsor rotor. The electric machine is coupled to and is configured to drive rotation of the first compressor rotor. The turbine rotor is coupled to and is configured to drive rotation of the second compressor rotor. The flowpath extends sequentially across the first compressor rotor, the second compressor rotor, the combustor and the turbine rotor.

The first rotating assembly may be rotatable about a propulsor axis. The first core rotating structure may be rotatable about a first structure axis. The second core rotating structure may be rotatable about a second structure axis. The propulsor axis may be offset from the first structure axis and/or the second structure axis. In addition or alternatively, the first structure axis may be offset from the second structure axis.

The turbine engine may also include an electric machine. The first core rotating structure may be configured to be solely rotatably driven by the electric machine.

The first structure axis may be laterally offset from the propulsor axis.

The first structure axis may be laterally offset from the second structure axis.

The second structure axis may be angularly offset from the propulsor axis.

The second structure axis may be angularly offset from the first structure axis.

The first structure axis may be parallel with the propulsor axis.

The first structure axis may be parallel with the second structure axis.

The first structure axis may be angularly offset from the propulsor axis.

The turbine engine may also include a power turbine section which includes a power turbine rotor. The power turbine rotor may be mechanically coupled to and configured to drive rotation of the propulsor rotor. The flowpath may extend through the power turbine section from the core turbine section to the exhaust.

The power turbine rotor may be coaxial with the propulsor rotor.

The engine core may be located axially between the propulsor rotor and the power turbine rotor along the propulsor axis.

The first rotating structure may be located axially between the propulsor rotor and the power turbine rotor along the propulsor axis. The power turbine rotor may be located axially between the propulsor rotor and the second rotating structure along the propulsor axis.

The power turbine rotor may be located axially between the propulsor rotor and the engine core.

The power turbine rotor may be mechanically coupled to and configured to drive rotation of the first rotating structure.

The turbine engine may also include an electric machine mechanically coupled to and configured to drive rotation of the first rotating structure.

The second rotating structure may also include a turbine rotor. The turbine rotor may be arranged within the core turbine section and configured to drive rotation of the second compressor rotor.

The propulsor rotor may be configured as or otherwise include a fan rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
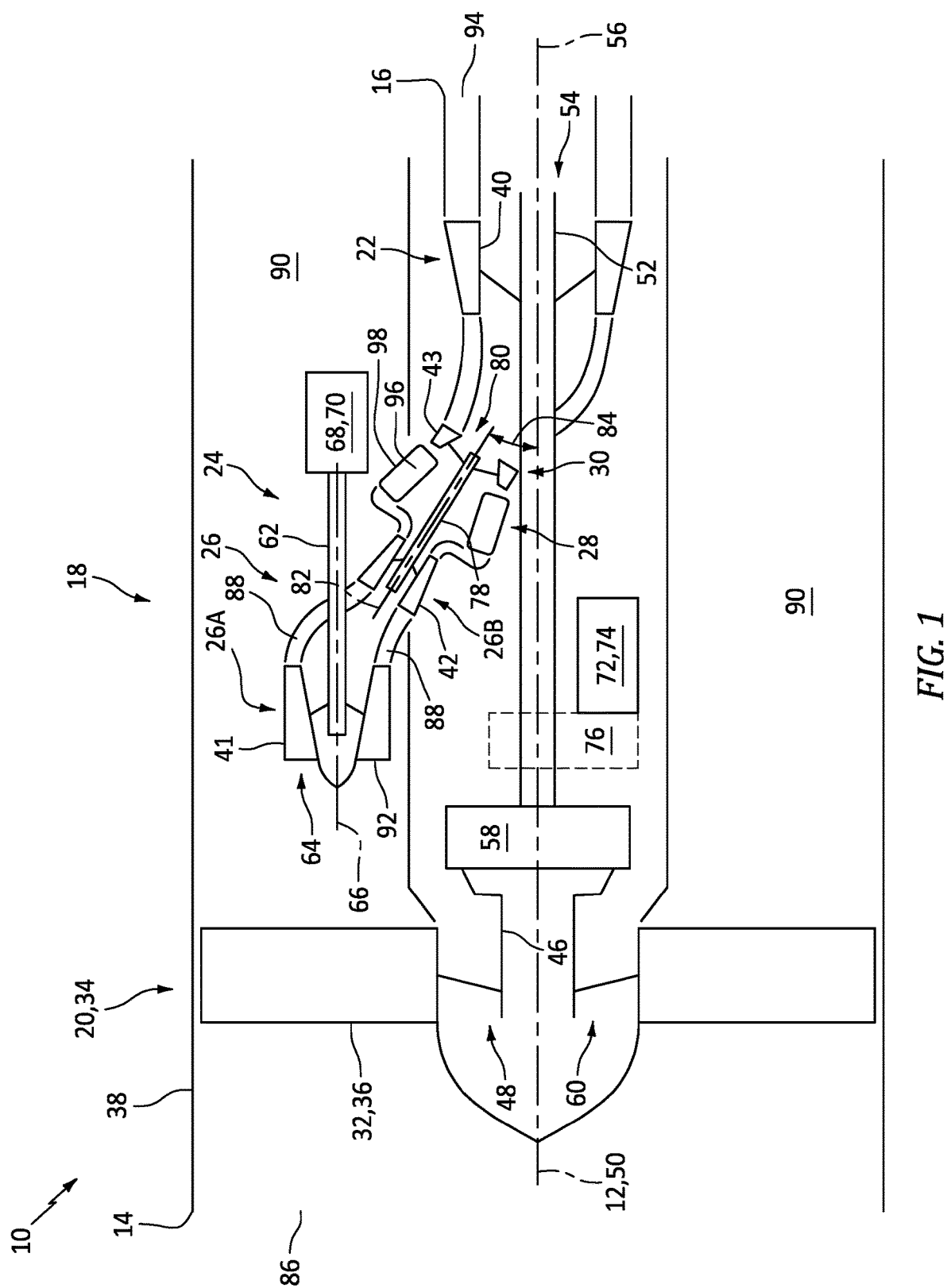
FIGS. 1-6 are partial schematic illustrations of an aircraft propulsion system with various rotating structure arrangements.

FIG. 1 illustrates a propulsion system 10 for an aircraft. The aircraft may be an airplane, a drone (e.g., an unmanned aerial vehicle (UAV)) or any other manned or unmanned aerial vehicle or system. The aircraft propulsion system 10 extends axially along an axial centerline 12 of the aircraft propulsion system 10 between a forward, upstream end 14 of the aircraft propulsion system 10 and an aft, downstream end 16 of the aircraft propulsion system 10. This aircraft propulsion system 10 is powered by a gas turbine engine 18.

The turbine engine 18 of FIG. 1 includes a propulsor section 20, a power turbine (PT) section 22 and a segmented and/or modular turbine engine core 24. The engine core 24 includes a core compressor section 26, a core combustor section 28 and a core turbine section 30. The core compressor section 26 of FIG. 1 includes a low pressure compressor (LPC) section 26A and a high pressure compressor (HPC) section 26B. The core turbine section 30 of FIG. 1 is configured as a high pressure turbine (HPT) section of the turbine engine 18. The PT section 22 of FIG. 1 is configured as a low pressure turbine (LPT) section of the turbine engine 18.

The propulsor section 20 includes a bladed propulsor rotor 32. The propulsor section 20 of FIG. 1, in particular, is configured as a fan section 34 of the turbine engine 18, and the propulsor rotor 32 is configured as a fan rotor 36 housed within a fan duct 38 of the turbine engine 18. The turbine engine 18, for example, may be a turbofan engine; e.g., a high-bypass turbofan engine. The present disclosure, however, is not limited to such an exemplary engine arrangement nor to a gas turbine engine with a ducted propulsor rotor. The turbine engine 18, for example, may alternatively be configured as an open rotor engine where the propulsor rotor 32 is configured as an open propulsor rotor; e.g., an un-ducted propulsor rotor. The turbine engine 18, for example, may be a turboprop engine, and the propulsor rotor 32 may be a propeller rotor. In another example, the turbine engine 18 may be a propfan engine, and the propulsor rotor 32 may be a propfan rotor. In still another example, the turbine engine 18 may be a pusher fan engine, and the propulsor rotor 32 may be a pusher fan rotor. However, for ease of description, the propulsor section 20 and the propulsor rotor 32 may be generally described below as the fan section 34 and the fan rotor 36.

The PT section 22 includes a bladed power turbine (PT) rotor 40. The LPC section 26A includes a bladed low pressure compressor (LPC) rotor 41. The HPC section 26B includes a bladed high pressure compressor (HPC) rotor 42. The core turbine section 30 includes a bladed core turbine rotor 43. The turbine rotor 43 of FIG. 1 is configured as a high pressure turbine (HPT) rotor of the turbine engine 18. The PT rotor 40 of FIG. 1 is configured as a low pressure turbine (LPT) rotor of the turbine engine 18.

Each bladed engine rotor 32, 36, 40-43 includes at least one rotor base (e.g., a disk or a hub) and at least one array (e.g., stage) of rotor blades arranged circumferentially around and connected to the respective rotor base. The rotor blades, for example, may be formed integral with or mechanically fastened, welded, brazed and/or otherwise attached to the respective rotor base.

The propulsor rotor 32 is connected to a propulsor shaft 46. At least (or only) the propulsor rotor 32 and the propulsor shaft 46 collectively form a propulsor rotating structure 48. The propulsor rotating structure 48 is rotatable about a propulsor axis 50, which propulsor axis 50 may be the same as (e.g., coaxial with) or different than the axial centerline 12.

The PT rotor 40 is connected to a power turbine (PT) shaft 52. At least (or only) the PT rotor 40 and the PT shaft 52 collectively form a power turbine (PT) rotating structure 54. The PT rotating structure 54 is rotatable about a power turbine (PT) axis 56, which PT axis 56 may be the same as the propulsor axis 50.

The PT rotating structure 54 of FIG. 1 is connected to the propulsor rotating structure 48 through a geartrain 58; e.g., an epicyclic gear system, a reduction gear system, a transmission, etc. At least (or only) the propulsor rotor 32, the propulsor shaft 46, the geartrain 58, the PT shaft 52 and the PT rotor 40 collectively form a propulsion rotating assembly 60. With this arrangement, the PT rotor 40 is mechanically coupled to and operable to drive rotation of the propulsor rotor 32 about the propulsor axis 50. Moreover, the PT rotating structure 54 and its PT rotor 40 may rotate at a different (e.g., faster) rotational velocity than the propulsor rotating structure 48 and its propulsor rotor 32. It is contemplated, however, the PT rotor 40 may alternatively be mechanically coupled to the propulsor rotor 32 through a direct drive drivetrain where the PT rotor 40 and the propulsor rotor 32 may rotate at a common (the same) rotational velocity.

The LPC rotor 41 is connected to a low pressure compressor (LPC) shaft 62. At least (or only) the LPC rotor 41 and the LPC shaft 62 collectively form a low pressure compressor (LPC) rotating structure 64; e.g., a rotating structure of the engine core 24. The LPC rotating structure 64 is rotatable about a low pressure compressor (LPC) axis 66, which LPC axis 66 is offset from the propulsor axis 50 as well as the axial centerline 12. The LPC axis 66 of FIG. 1, for example, is laterally offset from (e.g., radially outboard of) the propulsor axis 50 and the axial centerline 12. This LPC axis 66 of FIG. 1 is further parallel with the propulsor axis 50 and/or the axial centerline 12. However, it is contemplated the LPC axis 66 may also or alternatively be angularly offset from the propulsor axis 50 and/or the axial centerline 12.

The LPC rotating structure 64 and its members 41 and 62 of FIG. 1 are located radially outboard of the propulsion rotating assembly 60 and its members 40, 46, 52 and 58. By locating an entirety of the LPC rotating structure 64 to a lateral side (e.g., a radial outer side) of the propulsion rotating assembly 60, the propulsion rotating assembly 60 and its PT shaft 52 may extend axially along a side of the LPC rotating structure 64—not through an internal bore of the LPC rotating structure 64. The LPC rotating structure 64 therefore need not be nested with the propulsion rotating assembly 60. This separation of the LPC rotating structure 64 from the propulsion rotating assembly 60 may facilitate, among other things, sizing the LPC shaft 62 smaller than the PT shaft 52, and/or decreasing a size of the LPC section 26A to promote greater turbine engine efficiency.

The LPC rotating structure 64 of FIG. 1 is mechanically coupled to a power module 68. More particularly, an output from the power module 68 is connected to the LPC shaft 62. The power module 68 is thereby operable to (e.g., solely) drive rotation of the LPC rotating structure 64 and its LPC rotor 41 about the LPC axis 66. The power module 68 may be a mechanically independent device. The power module

68, for example, may be configured to drive rotation of the LPC rotating structure 64 without receiving a torque input from another rotor of the turbine engine 18. The power module 68 of FIG. 1, for example, is configured as an electric motor 70, or more generally an electric machine operable as the electric motor 70. This electric motor 70 is configured to receive electrical power from an electric power source 72. The electric power source 72 may be or otherwise include another as an electric generator 74, or more generally another electric machine operable as the electric generator 74. This electric generator 74 may be rotatably driven by the propulsion rotating assembly 60 and, more particularly, the PT rotating structure 54. The electric generator 74, for example, may be mechanically coupled to the PT rotating structure 54 through an accessory gearbox 76 for the turbine engine 18. The electric power source 72 may also or alternatively be or otherwise include a power storage device (e.g., one or more batteries), and/or another electrical power source onboard the aircraft; e.g., an electric generator with another propulsion system engine, an auxiliary power unit (APU), etc. However, it is contemplated the power module 68 may alternatively be configured as another type of motor such as a fluid motor or the like.

The HPC rotor 42 is connected to the turbine rotor 43 through a high speed shaft 78. At least (or only) the HPC rotor 42, the high speed shaft 78 and the turbine rotor 43 collectively form a high speed rotating structure 80; e.g., another rotating structure of the engine core 24. The high speed rotating structure 80 is rotatable about a high speed axis 82, which high speed axis 82 is offset from one or more of the axes 50, 56, 66 and/or the axial centerline 12. The high speed axis 82 of FIG. 1, for example, is angularly offset from each of the axes 50, 56, 66 by a respective included angle (e.g., 84). Each included angle (e.g., 84) may be an acute angle, for example, greater than zero degrees (>0°) and less than (or equal to) forty-five degrees (≤45°); e.g., between twenty degrees (20°) and thirty-five degrees (35°). The present disclosure, however, is not limited to such an exemplary arrangement. The high speed axis 82 (along the high speed rotating structure 80) is further laterally offset from the each of the axes 50, 56, 66.

The high speed rotating structure 80 and its members 42, 43 and 78 of FIG. 1 are located radially outboard of the propulsion rotating assembly 60 and its member 52. By locating an entirety of the high speed rotating structure 80 to the lateral side (e.g., the radial outer side) of the propulsion rotating assembly 60, the propulsion rotating assembly 60 and its PT shaft 52 may extend axially along a side of the high speed rotating structure 80—not through an internal bore of the high speed rotating structure 80. The high speed rotating structure 80 therefore need not be nested with the propulsion rotating assembly 60. Similarly, the high speed rotating structure 80 and its members 42, 43 and 78 of FIG. 1 are located radially inboard of the LPC rotating structure 64 and its member 62. By locating the entirety of the high speed rotating structure 80 to a lateral side (e.g., a radial outer side) of the LPC rotating structure 64, the LPC rotating structure 64 and its LPC shaft 62 may extend axially along a side of the high speed rotating structure 80—not through the internal bore of the high speed rotating structure 80. The high speed rotating structure 80 therefore need not be nested with the LPC rotating structure 64. More particularly, the high speed rotating structure 80 of FIG. 1 is arranged laterally (e.g., radially) between and spaced from (a) the propulsion rotating assembly 60 and its PT shaft 52 and (b) the LPC rotating structure 64 and its LPC shaft 62. This separation of the high speed rotating structure 80 from the propulsion rotating assembly 60 and the LPC rotating structure 64 may facilitate, among other things, sizing the high speed shaft 78 smaller than the PT shaft 52 and/or the LPC shaft 62, and/or decreasing a size of the HPC section 26B and/or the core turbine section 30 to promote greater turbine engine efficiency.

During operation, air enters the aircraft propulsion system 10 and its turbine engine 18 through an airflow inlet 86. This air is directed through the propulsor section 20 and its duct 38 (longitudinally across the propulsor rotor 32) and into a core flowpath 88 and a bypass flowpath 90 at (e.g., on, adjacent or proximate) an aft, downstream end of the propulsor section 20. The core flowpath 88 extends sequentially through the LPC section 26A, the HPC section 26B, the core combustor section 28, the core turbine section 30 and the PT section 22 from an airflow inlet 92 into the core flowpath 88 to a combustion products exhaust 94 from the core flowpath 88. More particularly, the core flowpath 88 extends sequentially from the core inlet 92, longitudinally across the LPC rotor 41, the HPC rotor 42, a combustion chamber 96 (e.g., an annular combustion chamber) within a combustor 98 (e.g., an annular combustor) of the core combustor section 28, the turbine rotor 43 and the PT rotor 40, to the core exhaust 94. The air entering this core flowpath 88 may be referred to as "core air". The bypass flowpath 90 extends through a bypass duct (e.g., an annular duct) from an airflow inlet into the bypass flowpath 90 to an airflow exhaust from the bypass flowpath 90. This bypass flowpath 90 bypasses the engine core 24 and each of its engine sections 26A, 26B, 28 and 30 as well as the PT section 22. The air entering this bypass flowpath 90 may be referred to as "bypass air".

The core air is compressed by the LPC rotor 41 and the HPC rotor 42 and directed into the combustion chamber 96 in the core combustor section 28. Fuel is injected into the combustion chamber 96 and mixed with the compressed core air to provide a fuel-air mixture. This fuel-air mixture is ignited and combustion products thereof flow through and sequentially cause the turbine rotor 43 and the PT rotor 40 to rotate. The rotation of the turbine rotor 43 drives rotation of the HPC rotor 42. The electric motor 70 of FIG. 1—the power module 68—drives rotation of the LPC rotor 41. The rotation of the LPC rotor 41 and the HPC rotor 42 thereby compress the core air received from the core inlet 92. The rotation of the PT rotor 40 drives rotation of the propulsor rotor 32, and the PT rotor 40 of FIG. 1 also mechanically powers operation of the electric generator 74 to provide electric power to the electric motor 70, for example. The rotation of the propulsor rotor 32 propels the bypass air through the bypass flowpath 90 and out of the aircraft propulsion system 10 through the bypass exhaust to provide aircraft thrust. The propulsion of the bypass air may account for a majority of thrust generated by the aircraft propulsion system 10 and its turbine engine 18, e.g., more than seventy-five percent (75%) of engine thrust. The aircraft propulsion system 10 of the present disclosure, however, is not limited to the foregoing exemplary thrust ratio.

Figure 2:
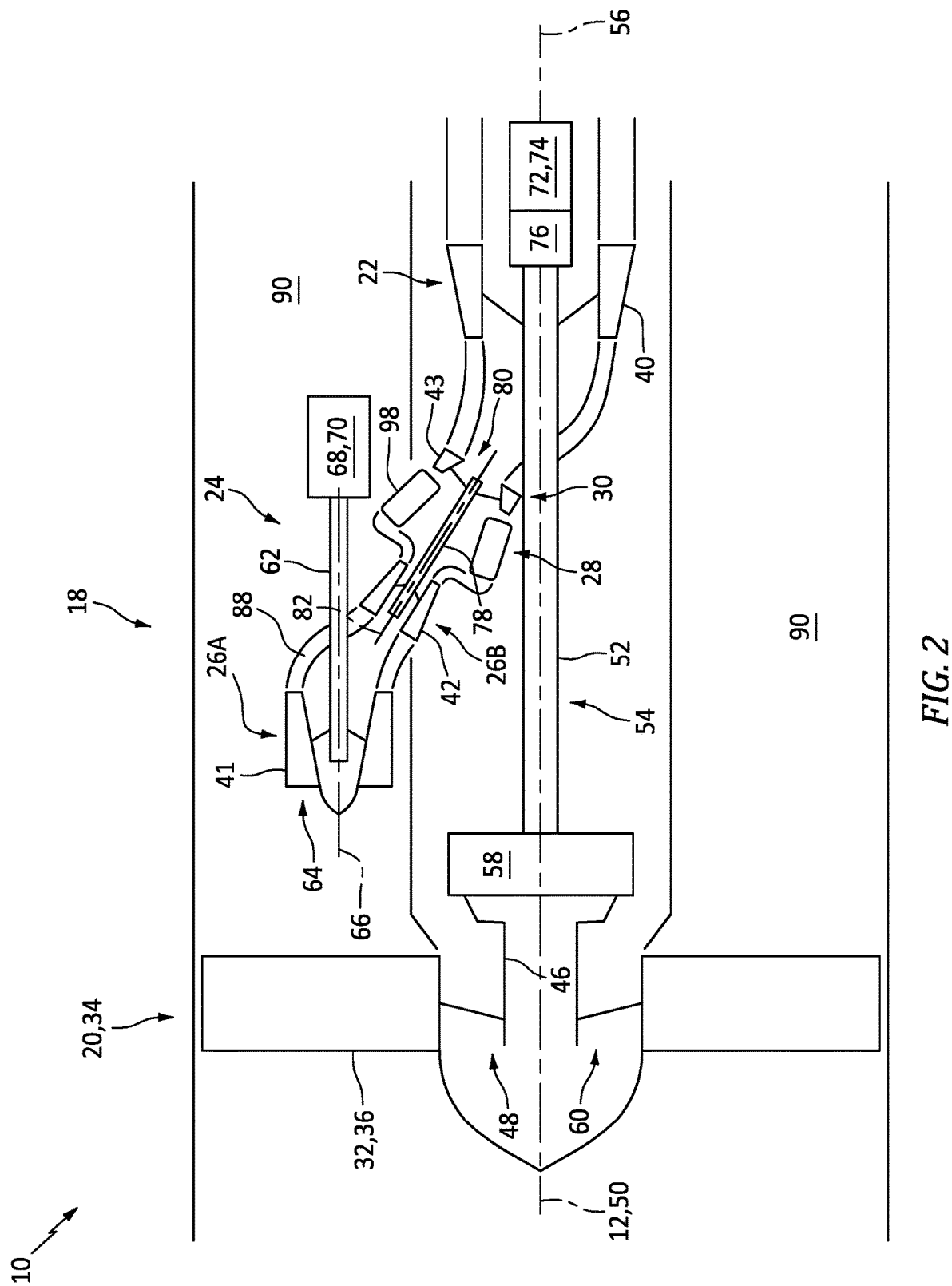

In some embodiments, referring to FIG. 1, the accessory gearbox 76 and the electric generator 74 may be arranged axially along the propulsor axis 50 and/or the axial centerline 12 between (a) the PT section 22 and its PT rotor 40 and (b) the propulsor rotor 32 and/or the geartrain 58. The accessory gearbox 76 of FIG. 1, for example, is operatively coupled to the PT rotating structure 54 and its PT shaft 52; e.g., to a side of the PT rotating structure 54 via a tower shaft. In other embodiments, referring to FIG. 2, the accessory gearbox 76 and the electric generator 74 may be arranged axially aft of the PT section 22. The PT section 22 of FIG. 2 and its PT rotor 40, for example, are arranged axially along the propulsor axis 50 and/or the axial centerline 12 between (a) the accessory gearbox 76 and (b) the propulsor rotor 32 and/or the geartrain 58. Here, the accessory gearbox 76 is operably coupled (e.g., inline) to the PT rotating structure 54 and its PT shaft 52.

Figure 3:
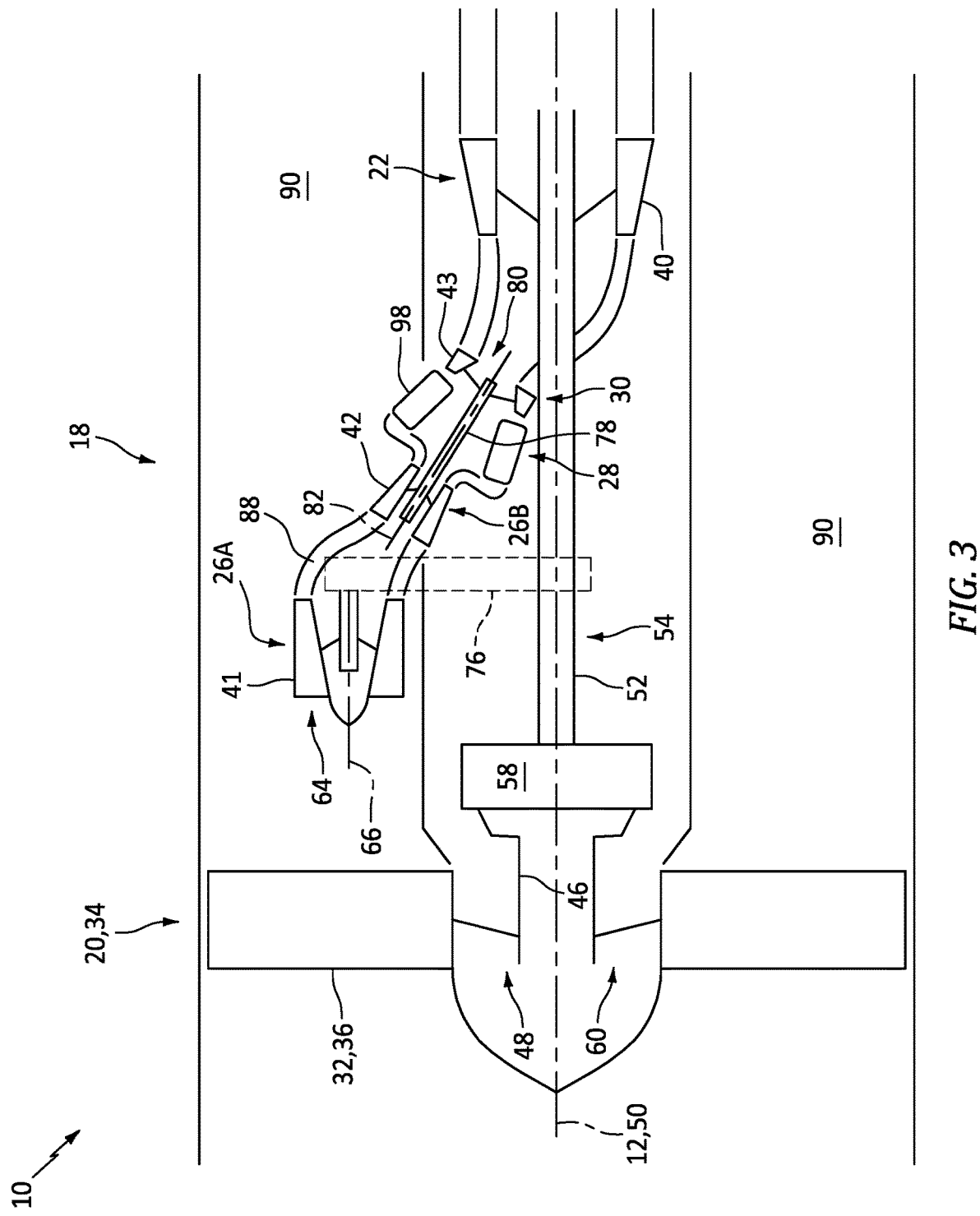

In some embodiments, referring to FIG. 1, the LPC rotating structure 64 may be mechanically independent of a turbine rotor and/or another rotating structure within the turbine engine 18. The LPC rotating structure 64 of FIG. 1, for example, is mechanically coupled to and rotatably driven by the power module 68; e.g., the electric motor 70. In other embodiments, referring to FIG. 3, the LPC rotating structure 64 may alternatively be mechanically coupled to another rotating structure within the turbine engine 18. The LPC rotating structure 64 of FIG. 3, for example, is mechanically coupled to and rotatably driven by the PT rotating structure 54 and its PT rotor 40, for example, through the accessory gearbox 76 and/or another drivetrain.

Figure 4:
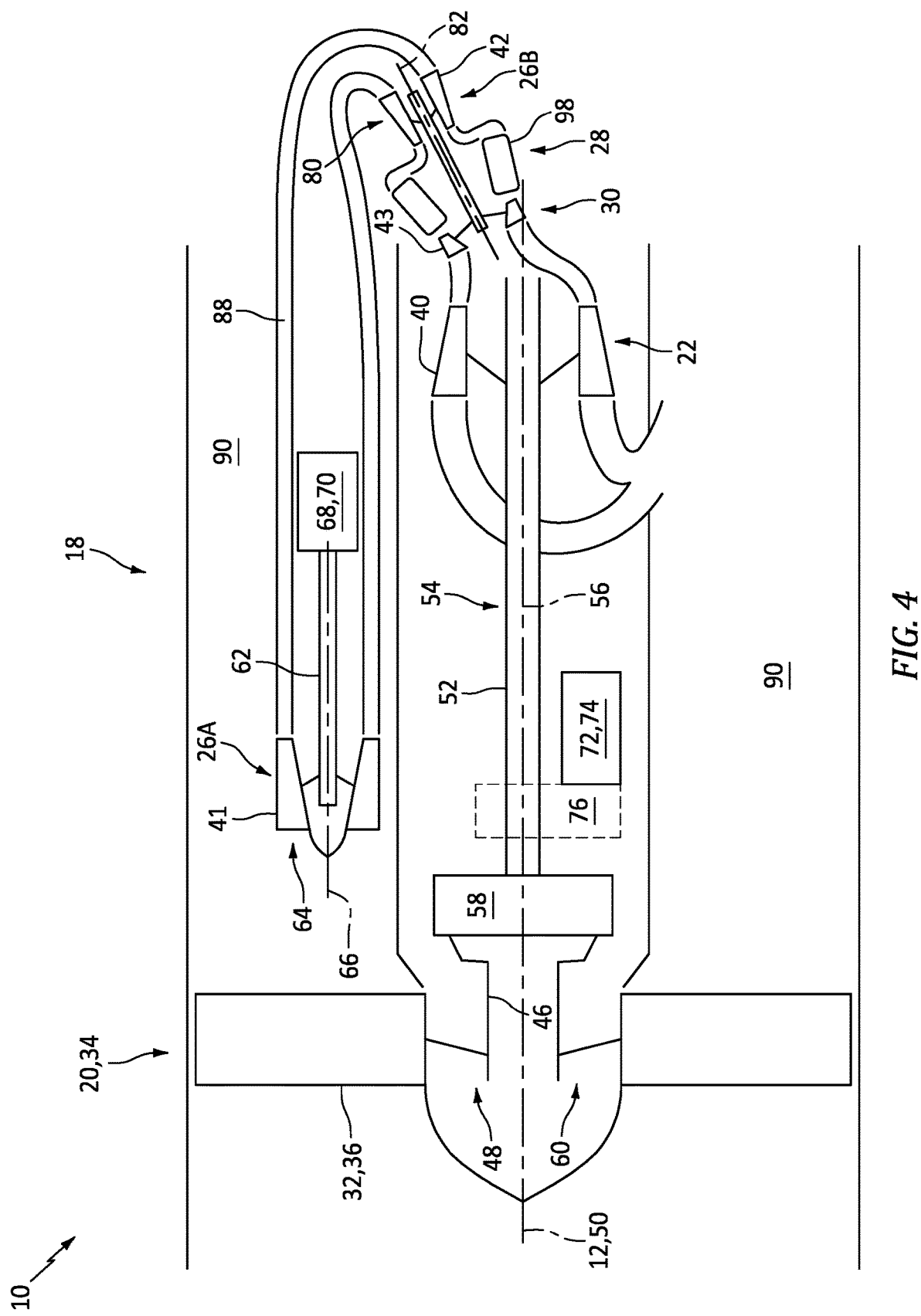
Figure 5:
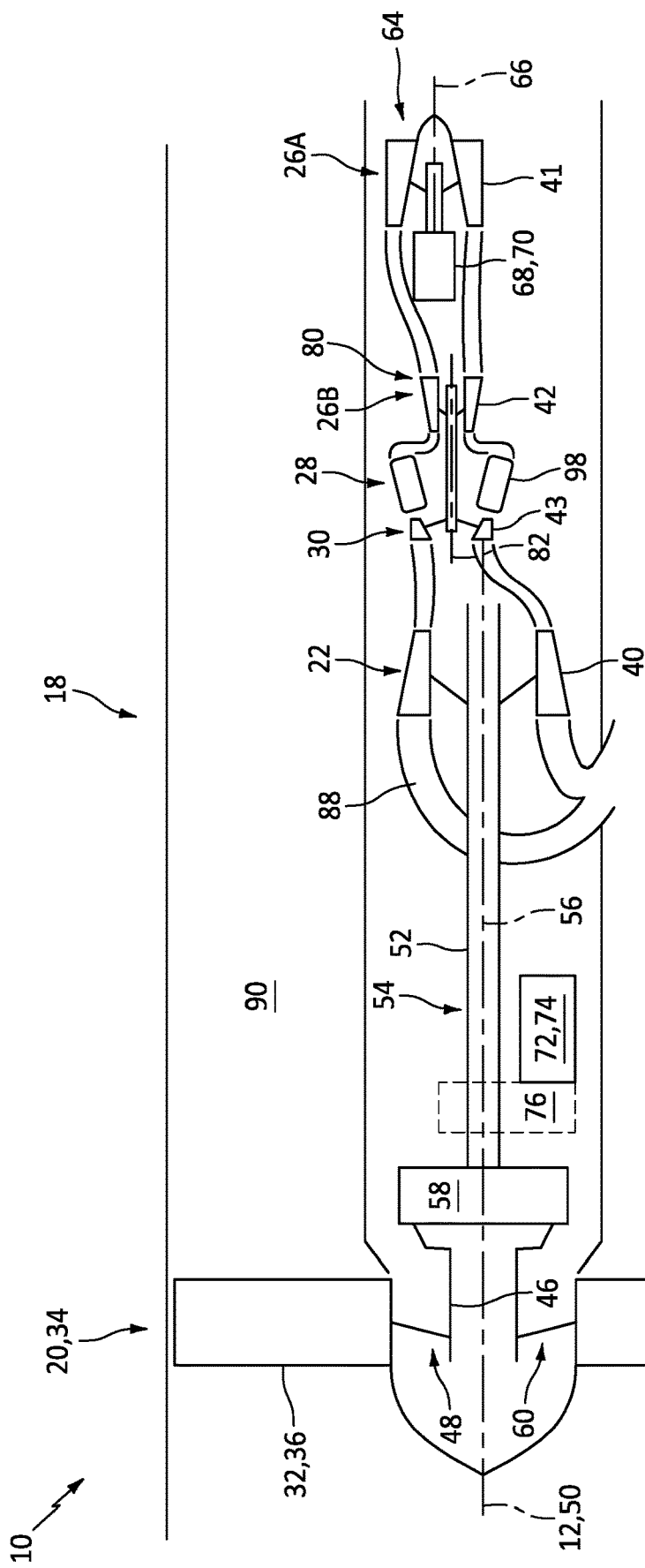

In some embodiments, referring to FIG. 1, the LPC rotating structure 64 and the high speed rotating structure 80 may each be arranged axially along the propulsor axis 50 and/or the axial centerline 12 between (a) the PT section 22 and its PT rotor 40 and (b) the propulsor rotor 32 and/or the geartrain 58. The LPC section 26A of FIG. 1 and its LPC rotor 41, for example, are arranged axially between (a) the high speed rotating structure 80 and (b) the propulsor rotor 32 and/or the geartrain 58. The high speed rotating structure 80 of FIG. 1 is arranged axially between (a) the LPC section 26A and its LPC rotor 41 and (b) the PT section 22 and its PT rotor 40. The high speed rotating structure 80 of FIG. 1 is also disposed axially along the PT shaft 52 and/or the LPC shaft 62. In other embodiments, referring to FIG. 4, the high speed rotating structure 80 may be arranged axially aft of the PT section 22 and its PT rotor 40. The PT section 22 of FIG. 4 and its PT rotor 40, for example, are arranged axially between the LPC rotating structure 64 and the high speed rotating structure 80. In still other embodiments, referring to FIG. 5, both the LPC rotating structure 64 and the high speed rotating structure 80 may be arranged axially aft of the PT section 22 and its PT rotor 40. The PT section 22 of FIG. 5 and its PT rotor 40, for example, are arranged axially between (a) the propulsor section 20 and its propulsor rotor 32 and (b) the high speed rotating structure 80. The high speed rotating structure 80 of FIG. 5 is arranged axially between (a) the PT section 22 and its PT rotor 40 and (b) the LPC rotating structure 64.

Figure 6:
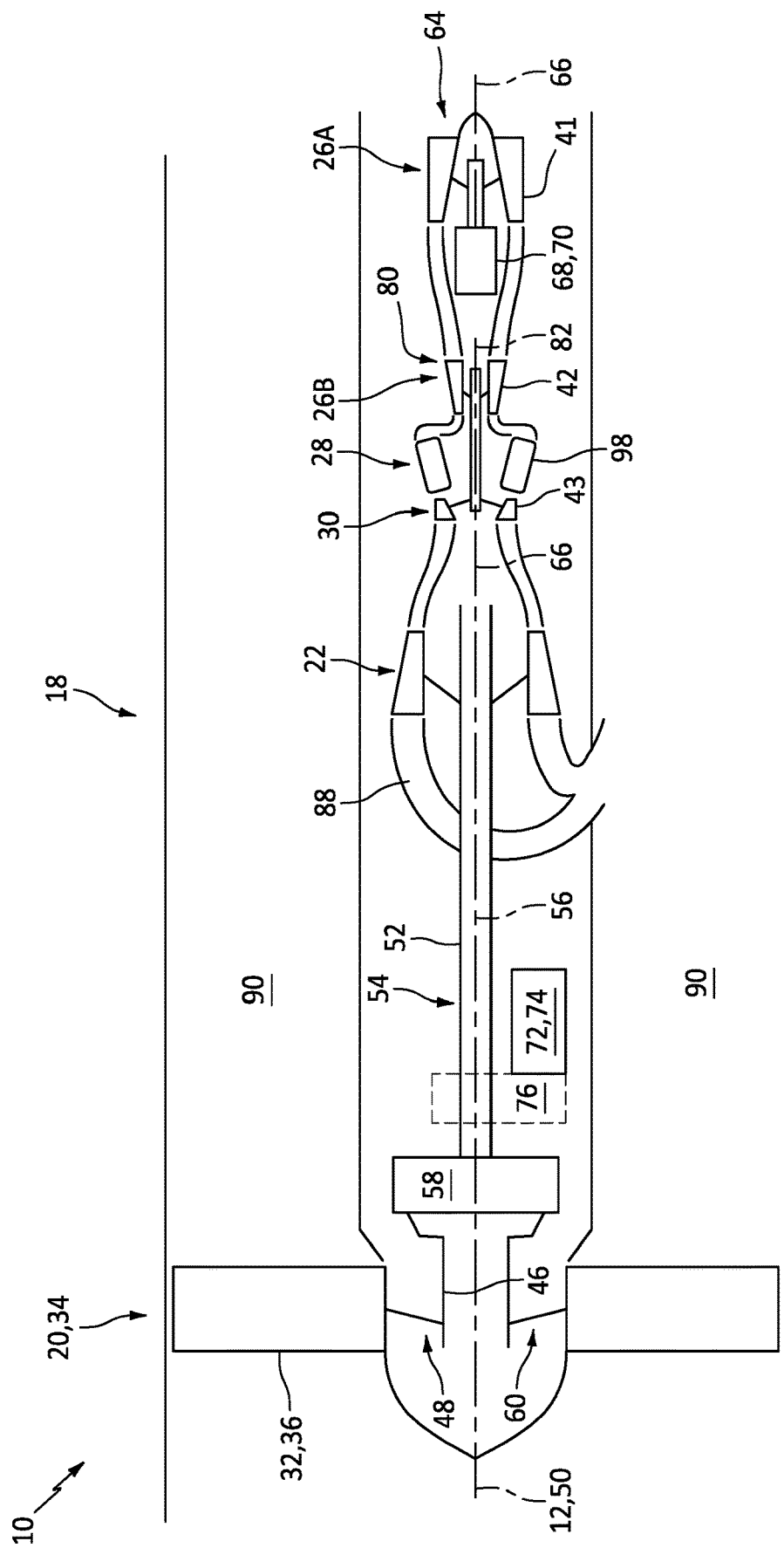

While the axes 50, 66 and 82 of FIGS. 1-5 are laterally and/or angularly offset from one another, the present disclosure is not limited to such exemplary arrangements. It is contemplated, for example, two or more of the axes 50, 66 and 82 may alternatively be coaxial while, for example, still providing independent rotating structures/rotating assemblies. For example, while the axes 50, 66 and 82 of FIG. 6 are coaxial, the rotating structures 48, 54, 64 and 80 are not nested with one another. Thus, the rotating structures 48, 54, 64 and 80 can be independently configured (e.g., sized, arranged, etc.) to facilitate improved turbine engine efficiently and/or improved rotor-dynamic stability. Referring to FIGS. 1-6, providing independent rotating structures 48, 54, 64 and 80 may also facilitate providing the turbine engine 18 with a modular construction. With such an arrangement, it is contemplated any one or more of the rotating structures 48, 54, 64 and/or 80 may be removed from the turbine engine 18 without, for example, requiring removal and/or disassembly of another one or more of the rotating structures 48, 54, 64 and/or 80.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A turbine engine, comprising:
a first rotating assembly including a propulsor rotor and a power turbine rotor configured to drive rotation of the propulsor rotor;
an engine core, the engine core comprising a first core rotating structure including a first compressor rotor, a second core rotating structure including a second compressor rotor and a turbine rotor, a combustor, and a flowpath extending sequentially across the first compressor rotor, the second compressor rotor, the combustor and the turbine rotor;
an electric machine configured to drive rotation of the first core rotating structure, the electric machine disposed axially between the first compressor rotor and the second core rotating structure,
an accessory gearbox coupling a second electric machine to the first rotating assembly; and
a geartrain coupling the propulsor rotor to the power turbine rotor;
wherein the first rotating assembly does not extend axially through the first core rotating structure or the second core rotating structure;
wherein the first core rotating structure does not extend axially through the second core rotating structure, and the first core rotating structure is mechanically independent of the second core rotating structure;
wherein the geartrain is disposed axially between and spaced from the accessory gearbox and the propulsor rotor;
wherein the accessory gearbox is axially forward of the power turbine rotor; and
wherein the propulsor rotor is axially between a forward upstream end of the turbine engine and the engine core.

2. The turbine engine of claim 1, wherein
the first rotating assembly is rotatable about a propulsor axis;
the first core rotating structure is rotatable about a first structure axis;
the second core rotating structure is rotatable about a second structure axis; and
at least one of
the propulsor axis is offset from at least one of the first structure axis or the second structure axis; or
the first structure axis is offset from the second structure axis.

3. The turbine engine of claim 1, wherein the first core rotating structure is configured to be solely rotatably driven by the electric machine.

4. The turbine engine of claim 1, wherein the propulsor rotor is a ducted propulsor rotor.

5. The turbine engine of claim 1, wherein the turbine engine comprises a turbofan engine, and the propulsor rotor comprises a fan rotor.

6. The turbine engine of claim 1, wherein
the first rotating assembly is rotatable about a propulsor axis; and
the first core rotating structure is rotatable about a first structure axis that is parallel with the propulsor axis.

7. The turbine engine of claim 1, wherein
the first rotating assembly is rotatable about a propulsor axis; and
the second core rotating structure is rotatable about a second structure axis that is parallel with the propulsor axis.

8. The turbine engine of claim 1, wherein
the first core rotating structure is rotatable about a first structure axis; and
the second core rotating structure is rotatable about a second structure axis that is parallel with the first structure axis.

9. The turbine engine of claim 1, wherein the electric machine is a first electric machine, and the turbine engine further comprises a second electric machine coupled to the first rotating assembly.

10. The turbine engine of claim 9, wherein the second electric machine is disposed axially between the propulsor rotor and the power turbine rotor.

11. The turbine engine of claim 9, wherein the second electric machine is an electric generator.

12. The turbine engine of claim 9, further comprising a gearbox coupling the second electric machine to the first rotating assembly.

13. The turbine engine of claim 12, further comprising a geartrain coupling the propulsor rotor to the power turbine rotor.

14. The turbine engine of claim 13, wherein the geartrain is disposed axially between and spaced from the gearbox and the propulsor rotor.

15. A turbine engine, comprising:
a first rotating assembly including a ducted fan rotor and a power turbine rotor configured to drive rotation of the ducted fan rotor;
a first core rotating structure including a first compressor rotor;
a second core rotating structure including a second compressor rotor and a turbine rotor;
a combustor;
a flowpath extending sequentially across the first compressor rotor, the second compressor rotor, the combustor and the turbine rotor;
an accessory gearbox operatively coupled to the first rotating assembly; and
a geartrain coupling the ducted fan rotor to the power turbine rotor;
wherein the first rotating assembly does not extend axially through the first core rotating structure or the second core rotating structure;
wherein the first core rotating structure does not extend axially through the second core rotating structure, and the first core rotating structure is configured to rotate independent of the second core rotating structure,
wherein the geartrain is disposed axially between and spaced from the accessory gearbox and the ducted fan rotor;
wherein the accessory gearbox is axially forward of the power turbine rotor; and
wherein the ducted fan rotor is axially between a forward upstream end of the turbine engine and the first core rotating structure.

* * * * *